US008176539B2

(12) United States Patent
Aldor et al.

(10) Patent No.: US 8,176,539 B2
(45) Date of Patent: May 8, 2012

(54) METHODS FOR PROTECTING AGAINST COOKIE-POISONING ATTACKS IN NETWORKED-COMMUNICATION APPLICATIONS

(75) Inventors: Ori Aldor, Tel Aviv (IL); Neta Solomon, Oranit (IL)

(73) Assignee: Check Point Software Technologies Ltd., Tel Aviv (IL)

( * ) Notice: Subject to any disclaimer, the term of this patent is extended or adjusted under 35 U.S.C. 154(b) by 862 days.

(21) Appl. No.: 12/259,305

(22) Filed: Oct. 28, 2008

(65) Prior Publication Data

US 2010/0107234 A1    Apr. 29, 2010

(51) Int. Cl.
*G06F 21/00*    (2006.01)
(52) U.S. Cl. ............................................. 726/9; 713/153
(58) Field of Classification Search ....... 726/9; 713/153
See application file for complete search history.

(56) References Cited

U.S. PATENT DOCUMENTS

| 6,065,117 | A | * | 5/2000 | White | 713/159 |
| 7,197,568 | B2 | * | 3/2007 | Bourne et al. | 709/229 |
| 2002/0049900 | A1 | * | 4/2002 | Patrick | 713/151 |
| 2007/0245137 | A1 | * | 10/2007 | Bhagat et al. | 713/153 |
| 2008/0052775 | A1 | * | 2/2008 | Sandhu et al. | 726/14 |

OTHER PUBLICATIONS

Liu, A.X.; Kovacs, J.M.; Huang, C.-T.; Gouda, M.G.; , "A secure cookie protocol," Computer Communications and Networks, 2005. ICCCN 2005. Proceedings. 14th International Conference on , vol., No., pp. 333-338, Oct. 17-19, 2005 doi: 10.1109/ICCCN.2005.1523880 URL: http://ieeexplore.ieee.org/stamp/stamp.jsp?tp=&arnumber=1523880&isnumber=32582.*
Juels, A.; Jakobsson, M.; Jagatic, T.N.; , "Cache cookies for browser authentication," Security and Privacy, 2006 IEEE Symposium on , vol., No., pp. 5 pp.-305, May 21-24, 2006 doi: 10.1109/SP.2006.8 URL: http://ieeexplore.ieee.org/stamp/stamp.jsp?tp=&arnumber=1624020&isnumber=34091.*
Park, J.S.; Sandhu, R.; , "Secure cookies on the Web," Internet Computing, IEEE , vol. 4, No. 4, pp. 36-44, Jul/Aug 2000 doi: 10.1109/4236.865085 URL: http://ieeexplore.ieee.org/stamp/stamp.jsp?tp=&arnumber=865085&isnumber=18737.*

* cited by examiner

*Primary Examiner* — Nasser Goodarzi
*Assistant Examiner* — Dorianne Alvarado David
(74) *Attorney, Agent, or Firm* — Mark M. Friedman

(57) ABSTRACT

The present invention discloses methods, media, and gateways for protecting against cookie-poisoning attacks in networked-communication applications. Methods include the steps of: creating a protected gateway cookie, generated by a gateway, for a server cookie, generated by a server, wherein the server cookie is received by the gateway in an HTTP response message; and validating, by the gateway, that a client cookie from a client request has a corresponding gateway cookie with expected field values. Preferably, the field values include at least one field value selected from the group consisting of: a name, a hash value computed over the server cookie, a hash-function index, a timestamp, a nonce, a hash value computed over newly-generated values, a path, a domain, an expiration, and an HTTP-only value. Preferably, the gateway cookie is signed with a secret key. Most preferably, the secret key is generated by a secret seed.

12 Claims, 2 Drawing Sheets

METHODS FOR PROTECTING AGAINST COOKIE-POISONING ATTACKS IN NETWORKED-COMMUNICATION APPLICATIONS

FIELD AND BACKGROUND OF THE INVENTION

The present invention relates to methods for protecting against cookie-poisoning attacks in networked-communication applications.

"HTTP cookies", more commonly referred to as web cookies, tracking cookies or just cookies, are parcels of text sent by a server to a web browser, and then sent back unchanged by the browser each time the browser accesses that server. HTTP cookies are used for authenticating, tracking, and maintaining specific information about users such as site preferences or the contents of an electronic shopping cart.

While cookies are supposed to be stored and sent back to the server unchanged, an attacker may modify the value of cookies before sending the cookies back to the server. The process of tampering with the value of cookies is called a "cookie-poisoning" attack. Such attacks help malicious users to gain unauthorized information about other users and "steal their identity" (i.e. identity theft). Adequate cookie-poisoning protection should detect cookies that were modified on a client machine by verifying that cookies which are sent by the client are identical to the cookies that were set by the server.

In the prior art, Imperva Inc., Redwood Shores, Calif., provides a SecureSphere product for detecting cookie-poisoning attacks. In the Imperva approach, each HTTP request sent to the web server needs to be intercepted, the cookie information needs to be retrieved, and the cookie information needs to be checked against all stored cookies. However, since SecureSphere stores the cookie information on the gateway, memory on the gateway needs to be allocated for the information. In addition, the deletion of stored cookies needs to be managed. Furthermore, SecureSphere's functionality is detrimentally affected if the gateway crashes.

F5 Networks, Inc., Seattle, Wash., provides a BIG-IP Application Security Manager (ASM) (see white paper on "Web Application Vulnerabilities and Avoiding Application Exposure"). The BIG-IP ASM creates only one cookie which contains all other cookies' information for each domain. This means that the created cookie's path attribute should be for the topmost path (i.e. "/") in order to receive this cookie with any request for validation purposes. Such a configuration may cause unnecessary processing when the protected cookies are not designated for the topmost path. In addition, the expiration of the created cookie should be set to be as long as the longest original cookie-expiration period. Such a configuration may continue to "successfully" validate cookies that are already expired.

Ingrian Networks, Inc., Redwood City, Calif., provides an Active Application Security platform. When cookies pass through the platform, the platform applies an advanced cryptographic process to sensitive content within the cookie, and creates a digital signature that perfectly matches the content of the cookie. The signature is appended to the cookie, and used to validate the content of the cookie in every subsequent communication between web client and server. However, the platform adds the signature to the original cookie, and does not create a separate cookie. Such a configuration makes it impossible to use the cookie information in an HTML page because the HTML code will most probably assume that a specific cookie contains a specific value to display to the user. In addition, such a configuration requires the gateway to modify the cookie (i.e. delete the signature) every time the cookie is passed to the web server.

It would be desirable to have methods for protecting against cookie-poisoning attacks in networked-communication applications. Such methods would, inter alia, overcome the limitations of the prior art as described above.

SUMMARY OF THE INVENTION

It is the purpose of the present invention to provide methods for protecting against cookie-poisoning attacks in networked-communication applications.

Preferred embodiments of the present invention teach methods for protecting against cookie-poisoning attacks that do not store any cookie information, reducing memory consumption. In addition, there is no need to compare any cookie against all cookies that were seen by the gateway and no need to manage the deletion of stored cookies. Furthermore, enforcement is not detrimentally affected even if the gateway crashes, as would be the case if a large number of cookies are stored in the gateway's memory.

Therefore, according to the present invention, there is provided for the first time a method for protecting against cookie-poisoning attacks in networked-communication applications, the method including the steps of: (a) creating a protected gateway cookie, generated by a gateway, for a server cookie, generated by a server, wherein the server cookie is received by the gateway in an HTTP response message; and (b) validating, by the gateway, that a client cookie from a client request has a corresponding gateway cookie with expected field values.

Preferably, the field values include at least one field value selected from the group consisting of: a name, a hash value computed over the server cookie, a hash value computed over newly-generated values, a hash-function index, a timestamp, a nonce, a path, a domain, an expiration, and an HTTP-only value.

Preferably, the gateway cookie is signed with a secret key.

Most preferably, the secret key is generated by a secret seed.

According to the present invention, there is provided for the first time a computer-readable storage medium having computer-readable code embodied on the computer-readable storage medium, the computer-readable code including: (a) program code for creating a protected gateway cookie, generated by a gateway, for a server cookie, generated by a server, received in an HTTP response message; and (b) program code for validating, by the gateway, that a client cookie from a client request has a corresponding gateway cookie with expected field values.

Preferably, the field values include at least one field value selected from the group consisting of: a name, a hash value computed over the server cookie, a hash-function index, a timestamp, a nonce, a hash value computed over newly-generated values, a path, a domain, an expiration, and an HTTP-only value.

Preferably, the gateway cookie is signed with a secret key.

Most preferably, the secret key is generated by a secret seed.

According to the present invention, there is provided for the first time a gateway for protecting against cookie-poisoning attacks in networked-communication applications, the gateway including: (a) a cookie-generating module for creating a protected gateway cookie for a server cookie, generated by a server, wherein the server cookie is received by the gateway in an HTTP response message; and (b) a cookie-validating module for validating that a client cookie from a client request has a corresponding gateway cookie with expected field values.

Preferably, the field values include at least one field value selected from the group consisting of: a name, a hash value computed over the server cookie, a hash-function index, a timestamp, a nonce, a hash value computed over newly-generated values, a path, a domain, an expiration, and an HTTP-only value.

Preferably, the gateway cookie is signed with a secret key. Most preferably, the secret key is generated by a secret seed.

These and further embodiments will be apparent from the detailed description to and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to methods for protecting against cookie-poisoning attacks in networked-communication applications. The principles and operation for protecting against cookie-poisoning attacks, according to the present invention, may be better understood with reference to the accompanying description and the drawings.

Figure 1:
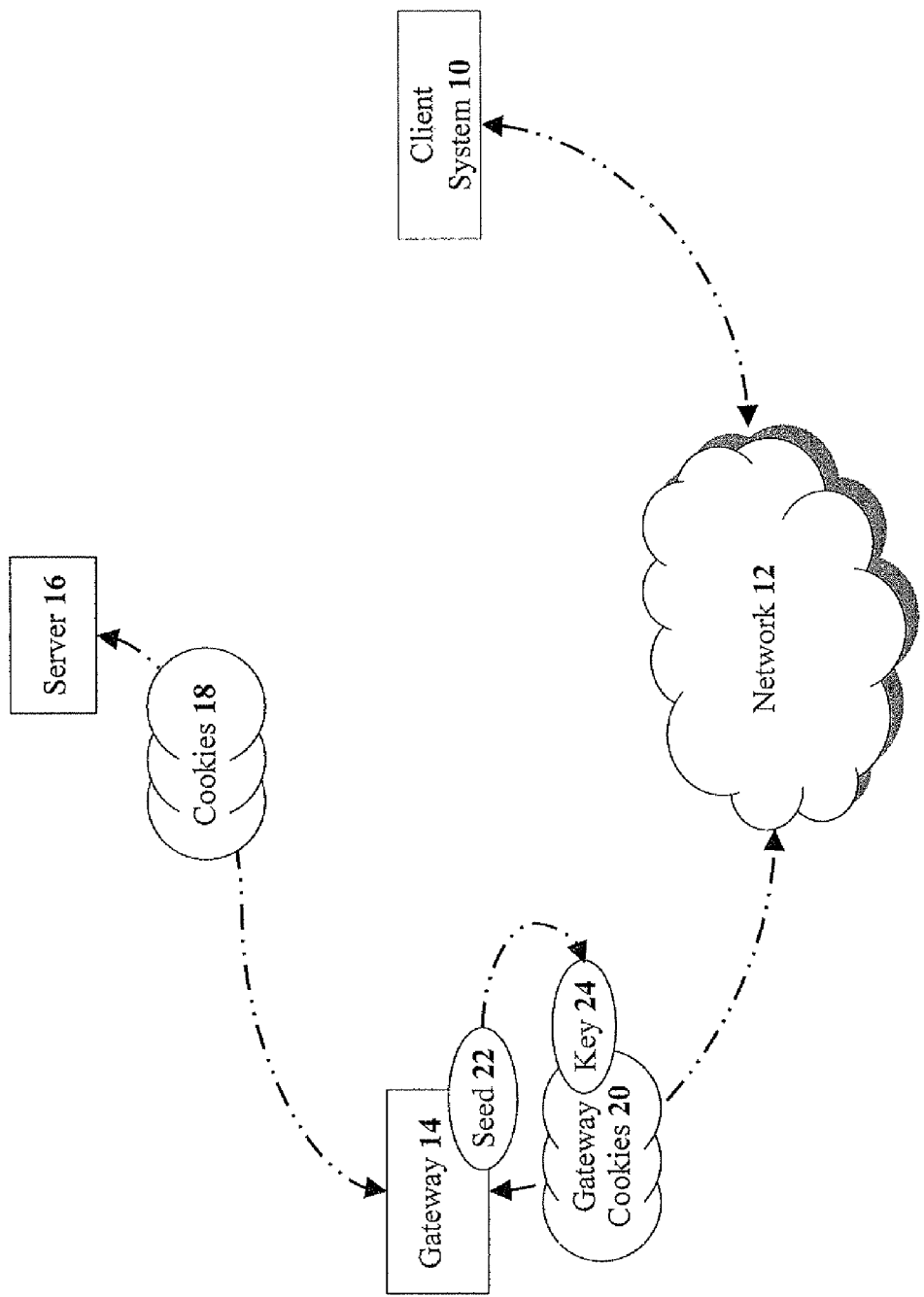
FIG. 1 is a simplified schematic block diagram of a system for protecting against cookie-poisoning attacks, according to preferred embodiments of the present invention.

Referring now to the drawing, FIG. 1 is a simplified schematic block diagram of a system for protecting against cookie-poisoning attacks, according to preferred embodiments of the present invention. A client system 10 is operationally connected, via a network 12 (e.g. the Internet), to a gateway 14 (e.g. a security gateway) which connects to a server 16 (e.g. a web server). In order to detect modified cookies, an algorithm cryptographically signs all cookies 18 set by server 16, and then verifies that cookies 18 sent by client system 10 match the signature.

For every cookie 18 that was set by server 16, gateway 14 will create a new gateway cookie 20 that signs the original cookie value-contents and has the same cookie attributes (i.e. path, domain, and expiration). This ensures that both original cookies 18 and gateway cookies 20 are always sent together by client system 10. Upon receiving a client request which contains cookies, gateway 14 will validate that all cookies 18 which should be protected have corresponding gateway cookies 20 with the expected field values.

Cookies 18 may be valid for long periods of time. So, in order to be able to verify a cookie's signature after a long time, and to maintain maximum security, preferred embodiments of the present invention use a never-changing secret seed 22 that creates a secret key 24 that will be used to sign new gateway cookies 20. Thus, gateway 14 does not replace seed 22, but gateway cookie 20 being sent is always signed by a new key 24.

As an example, new gateway cookie 20, created by gateway 14, has the following structure:
Name: CPWIID_<original cookie name>;
Value: A concatenation of the following fields:
    Hash2—a hash with secret key 24 computed over all of the other fields' values;
    Hash-function index—indicates which hash function was used to produce the message authentication code (e.g. SHA-1);
    Timestamp—the time that gateway cookie 20 was created;
    Nonce—for producing signature with secret seed 22 for gateway cookie 20; and
    Hash (<original cookie name><original cookie value>);
Path: <original cookie path attribute>;
Domain: <original cookie domain attribute>;
Expiration: <original cookie expiration attribute>; and
HttpOnly.

The timestamp helps to reduce the efficiency of cookie hijacking. The "HttpOnly" attribute restricts gateway cookie 20 only to HTTP protocol use. Thus, for example, gateway cookie 20 cannot be read by JavaScript code, which otherwise might have been confused by a second unknown cookie for the same domain.

Since gateway cookie 20 may contain binary characters, a base64 encoding is performed on the cookie value. For example, if the server sets a "name" cookie: Set-Cookie: Name=Rob%3Dert; expires=Mon, 23-Jun-2008 22:00:00 GMT; path=/, the client will also receive a "CPWIID_Name" cookie that will be set and created by the gateway: Set-Cookie: CPWIID_Name=JdKoXEiffU6w9wux AgAAAAAAABhYWFhYWFhYWFhYWFh9Ep MXXm/CwC3967W.

Table 1 shows a gateway cookie value after base64 decoding, according to preferred embodiments of the present invention (the values are displayed in hex since the content is binary).

TABLE 1

A gateway cookie value after base64 decoding, according to preferred embodiments of the present invention.

| Hash2 | Hash-function index | Timestamp |
|---|---|---|
| 25 d2 a8 5c 48 df 7d 4e b0 f7 0b b1 | 02 00 00 00 | 48 37 3e 60 |
| Nonce | Hash on original values | |
| 61 61 61 61 61 61 61 61 61 61 61 61 61 61 61 61 | f4 4a 4c 5d 79 bf 0b 00 b7 f7 ae d6 | |

Figure 2:
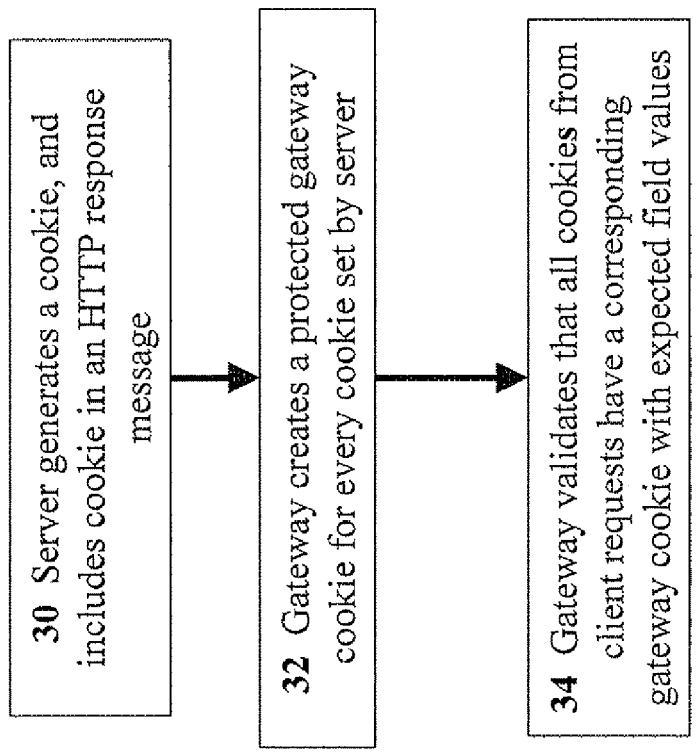
FIG. 2 is a simplified flowchart of the major operational steps for protecting against cookie-poisoning attacks, according to preferred embodiments of the present invention.

FIG. 2 is a simplified flowchart of the major operational steps for protecting against cookie-poisoning attacks, according to preferred embodiments of the present invention. The process starts with the server generating a cookie, and including the cookie in an HTTP response message (Step 30). The gateway creates a protected gateway cookie for every cookie set by the server (Step 32). The gateway validates that all cookies from client requests have a corresponding gateway cookie with the expected field values (Step 34).

While the invention has been described with respect to a limited number of embodiments, it will be appreciated that many variations, modifications, and other applications of the invention may be made.

What is claimed is:

1. A method for protecting against cookie-poisoning attacks in networked-communication applications, the method comprising the steps of
(a) creating a gateway cookie, generated by a gateway, which corresponds to an original cookie, generated by a server, wherein said original cookie is received by said gateway in an HTTP response message; wherein the gateway cookie has a standard HTTP cookie format, the gateway cookie includes same attributes as of the original cookie, and a value field that includes: a signature of a name and value of the original cookie; and (b) validating, by said gateway, that the original cookie from a client request is accompanied by the gateway cookie.

2. The method of claim 1, wherein said signature includes at least one field value selected from the group consisting of: a hash value computed over said original cookie, a hash-function index, a nonce and an encrypted hash value computed over the value field of the gateway cookie.

3. The method of claim 2, wherein said encrypted hash value is signed with a secret key.

4. The method of claim 3, wherein said secret key is generated by a never changing secret seed.

5. A non-transitory computer-readable storage medium having computer-readable code embodied on the computer-readable storage medium, the computer-readable code comprising:

(a) program code for creating a gateway cookie, generated by a gateway, which corresponds to an original cookie, generated by a server, received in an HTTP response message; wherein the gateway cookie has a standard HTTP cookie format, the gateway cookie includes same attributes as of the original cookie, and a value field that includes: a signature of a name and value of the original cookie; and (b) program code for validating, by said gateway, that the original cookie from a client request is accompanied by the gateway cookie.

6. The storage medium of claim 5, wherein said signature includes at least one field value selected from the group consisting of: a hash value computed over said original cookie, a hash-function index, a nonce and an encrypted hash value computed over the value field of the gateway cookie.

7. The storage medium of claim 6, wherein said encrypted hash value is signed with a secret key.

8. The storage medium of claim 7, wherein said secret key is generated by a never changing secret seed.

9. A gateway for protecting against cookie-poisoning attacks in networked-communication applications, the gateway comprising:

(a) a cookie-generating module which creates a gateway cookie which corresponds to an original cookie, generated by a server, wherein said original cookie is received by the gateway in an HTTP response message; wherein the gateway cookie has a standard HTTP cookie format, the gateway cookie includes same attributes as of the original cookie, and a value field that includes: a signature of a name and value of the original cookie; and (b) a cookie-validating module which validates that the original cookie from a client request is accompanied by the gateway cookie.

10. The gateway of claim 9, wherein said signature includes at least one field value selected from the group consisting of: a hash value computed over said original cookie, a hash-function index, a nonce and an encrypted hash value computed over the value field of the gateway cookie.

11. The gateway of claim 9, wherein said encrypted hash value is signed with a secret key.

12. The gateway of claim 11, wherein said secret key is generated by a never changing secret seed.

* * * * *